(12) United States Patent
Teh et al.

(10) Patent No.: US 8,959,503 B2
(45) Date of Patent: Feb. 17, 2015

(54) APPLICATION VERSION GATEKEEPING DURING UPGRADE

(71) Applicant: Microsoft Corporation, Redmond, WA (US)

(72) Inventors: PehKeong Teh, Redmond, WA (US); Lu Xun, Redmond, WA (US); Anurag Gupta, Redmond, WA (US); Vipul A. Modi, Sammamish, WA (US); Alex Wun, Bellevue, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 164 days.

(21) Appl. No.: 13/645,728

(22) Filed: Oct. 5, 2012

(65) Prior Publication Data

US 2014/0101648 A1    Apr. 10, 2014

(51) Int. Cl.
*G06F 9/445* (2006.01)
(52) U.S. Cl.
USPC .......................................... 717/170; 717/178
(58) Field of Classification Search
None
See application file for complete search history.

(56) References Cited

U.S. PATENT DOCUMENTS

| | | | |
|---|---|---|---|
| 5,506,988 A | 4/1996 | Weber | |
| 5,742,289 A | 4/1998 | Naylor et al. | |
| 5,867,713 A | 2/1999 | Shrader | |
| 5,933,646 A | 8/1999 | Henderickson | |
| 5,953,532 A | 9/1999 | Lochbaum | |
| 6,141,686 A | 10/2000 | Jackowski | |
| 6,282,712 B1 | 8/2001 | Davis | |
| 6,289,510 B1 | 9/2001 | Nakajima | |
| 6,353,926 B1 | 3/2002 | Parthesarathy | |
| 6,389,589 B1 | 5/2002 | Mishra | |
| 6,401,238 B1 | 6/2002 | Brown | |
| 6,418,554 B1 | 7/2002 | Delo | |
| 6,466,932 B1 | 10/2002 | Dennis | |
| 7,089,548 B2 | 8/2006 | Lin | |
| 7,350,205 B2 | 3/2008 | Ji | |
| 7,779,406 B2 | 8/2010 | Blanding et al. | |
| 7,801,947 B2 | 9/2010 | Yeh et al. | |
| 7,805,719 B2 * | 9/2010 | O'Neill | 717/168 |
| 2003/0084138 A1 * | 5/2003 | Tavis et al. | 709/223 |
| 2005/0120346 A1 | 6/2005 | Sprigg | |

OTHER PUBLICATIONS

"Redeploying Applications in a Production Environment", Retrieved on: Jul. 31, 2012, Available at: http://docs.oracle.com/cd/E11035_01/wls100/deployment/redeploy.html.

(Continued)

*Primary Examiner* — Chuck Kendall
(74) *Attorney, Agent, or Firm* — Ben Tabor; David Andrews; Micky Minhas (57) ABSTRACT

Embodiments are directed to ensuring that only one version of an application is running on a cluster. In one scenario, a computer system includes a configuration agent that generates service instance version queries upon startup to determine which service instance version to activate, maintains a service instance version table that includes a listing of service instance versions currently running on the computer system as part of one or more application instances and activates specified service instances. The computer system also includes a failover manager that manages service instance version queries. The failover manager indicates which service instance version to activate to ensure that the appropriate, current version is activated for each service instance. The computer system further includes a cluster manager that creates, deletes and upgrades service instances as part of an application instance upgrade.

20 Claims, 3 Drawing Sheets

(56) References Cited

OTHER PUBLICATIONS

U.S. Appl. No. 09/293,326, filed Apr. 16, 1999, Blanding.
U.S. Appl. No. 09/293,326, Jul. 17, 2002, Office Action.
U.S. Appl. No. 09/293,326, Apr. 9, 2003, Office Action.
U.S. Appl. No. 09/293,326, Dec. 31, 2003, Office Action.
U.S. Appl. No. 09/293,326, Oct. 21, 2004, Office Action.
U.S. Appl. No. 09/293,326, Jul. 27, 2005, Office Action.
U.S. Appl. No. 09/293,326, Feb. 28, 2006, Office Action.
U.S. Appl. No. 11/441,746, Nov. 20, 2009, Office Action.
U.S. Appl. No. 11/441,746, Mar. 5, 2010, Office Action.
U.S. Appl. No. 11/441,746, May 14, 2010, Notice of Allowance.

* cited by examiner

APPLICATION VERSION GATEKEEPING DURING UPGRADE

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to operate on a large scale. For instance, cloud-based applications and services are designed to operate in a distributed environment spread over a large number of physical and virtual computer systems. Managing these cloud-based applications and services can, at times, be an onerous task.

BRIEF SUMMARY

In a distributed computing system, many different applications and service instances may be running. These applications and service instances may be collectively or individually upgraded. Embodiments described herein are directed to ensuring that only one version of an application is running on a cluster and, more specifically, ensuring that only one version of an application is running upon completion of an application upgrade. In one embodiment, a computer system includes a configuration agent that performs the following: generates service instance version queries upon startup to determine which service instance version to activate, maintains a service instance version table that includes a listing of service instance versions currently running on the computer system as part of one or more application instances, where each application instance includes various service instances, and activates the specified service instances.

The computer system also includes a failover manager that manages service instance version queries. Upon receiving a service instance version query, the failover manager indicates to the configuration agent which service instance version to activate to ensure that the appropriate, current version is activated for each service instance. Still further, the computer system includes a cluster manager that performs at least one of creating, deleting and upgrading service instances as part of an application instance upgrade, where each application instance is independently upgradeable.

In another embodiment, a computer system is configured to perform a method for ensuring that only one version of an application is running during an application upgrade. The computer system maintains a service instance version table that includes a listing of service instance versions currently running on the computer system as part of one or more application instances, where each application instance includes one or more service instances. The computer system receives at least one service instance version query requesting that a specified service instance be activated and a failover manager of the computer system indicates which service instance version to activate based on the listing maintained in the service instance version table. The service instance version table ensures that the appropriate, current version is activated for each service instance. The computer system then activates the service instance indicated by the service instance version table.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

In a distributed computing system, many different applications and service instances may be running. These applications and services instances may be collectively or individually upgraded. Embodiments described herein are directed to ensuring that only one version of an application is running on a cluster and, more specifically, ensuring that only one version of an application is running upon completion of an application upgrade. In one embodiment, a computer system includes a configuration agent that performs the following: generates service instance version queries upon startup to determine which service instance version to activate, maintains a service instance version table that includes a listing of service instance versions currently running on the computer system as part of one or more application instances, where each application instance includes various service instances, and activates the specified service instances.

The computer system also includes a failover manager that manages service instance version queries. Upon receiving a service instance version query, the failover manager indicates to the configuration agent which service instance version to activate to ensure that the appropriate, current version is activated for each service instance. Still further, the computer system includes a cluster manager that performs at least one of creating, deleting and upgrading service instances as part of an application instance upgrade, where each application instance is independently upgradeable.

In another embodiment, a computer system is configured to perform a method for ensuring that only one version of an application is running during an application upgrade. The computer system maintains a service instance version table that includes a listing of service instance versions currently running on the computer system as part of one or more application instances, where each application instance includes one or more service instances. The computer system receives at least one service instance version query requesting that a specified service instance be activated and a failover manager of the computer system indicates which service instance version to activate based on the listing maintained in the service instance version table. The service instance version table ensures that the appropriate, current version is activated for each service instance. The computer system then activates the service instance indicated by the service instance version table.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g., cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally, or alternatively, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
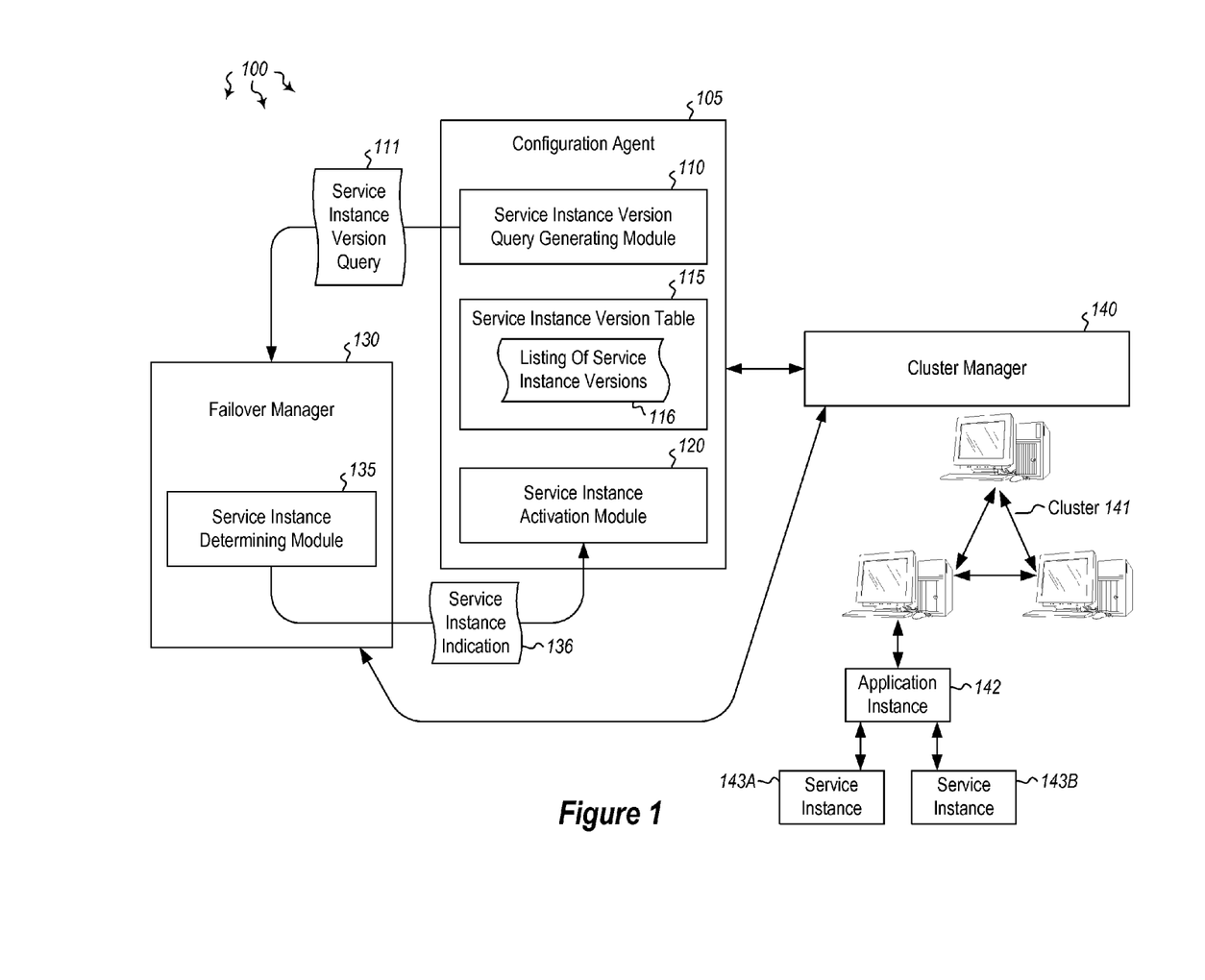
FIG. 1 illustrates a computer architecture in which embodiments described herein may operate including ensuring that only one version of an application is running on a cluster.

FIG. 1 illustrates a computer architecture 100 in which at least one embodiment may be employed. Computer architecture 100 includes a computer system that may be any type of local or distributed computer system, including a cloud computing system. The computer system includes various components and modules for performing a variety of different functions. These modules and components may interact with one another to achieve a desired result. For instance, a configuration agent 105 may be installed on a node in a cluster (e.g., 141). The cluster may include substantially any number of computer systems, although three are shown in the cluster of FIG. 1. Each node may include one or more virtual computer systems that may each be configured to run instances of an application.

As used herein, an application may include one or more services. Each application may be an instance of that application, and each service may be an instance of that service. Accordingly, an application instance may have a plurality of service instances. Each application and service instance has a specified version. Thus, application instance 142 may be version 1.1, while its corresponding service instances 143A and 143B may be version 2.4. Each service instance is its own entity and, as such, can be modified, created or removed without affecting other service instances. In some cases, when applications are upgraded, one or more of the services may be affected. Accordingly, service instances that need to be upgraded are changed on-the-fly. Service instances that were down or were experiencing latency during the upgrade may not know that the other service instances were upgraded. These service instances may then be activated using the old version. This may cause inconsistencies in the user experience, or may cause worse problems such as application crashes.

As such, the service instance version query generating module 110 may be used to generate a service instance version query 111 that is sent to a failover manager 130. Like the configuration agent 105, the failover manager 130 may be a component or module that is installed on some or all of the nodes in the cluster 141. The failover manager may consult a service instance version table 115 that includes a listing of service instance versions 116 that is maintained by the configuration agent 105. The service instance version table, while shown as being part of the configuration agent, may be located on any or all of the nodes in the cluster. As mentioned above, each of the software modules and components of FIG. 1 may be running on any of the cluster's nodes, and further within any of the virtual computer systems running on those nodes.

The service instance determining module 135 may thus consult the listing of service instance versions 116 to determine which service instance version should be running for a given application. Once the determination is made, an indication of that determination 136 can be sent to service instance activation module 120 where the service instance can be activated. In this manner, regardless of when a service tries to come online (even during an upgrade), the configuration agent and the failover manager ensure that the most recent, most up-to-date version of the service is activated.

In one embodiment, as illustrated generally in FIG. 1, a configuration agent 105 is running on at least one of the nodes in cluster 141. The configuration agent performs the following: generates service instance version queries (e.g., 111) upon startup to determine which service instance version to activate, maintains a service instance version table 115 that includes a listing 116 of service instance versions (e.g., 143A, 143B) currently running on the computer system as part of one or more application instances (e.g., 142), and activates specified service instances. As mentioned above, each application instance can include one or a plurality of service instances. These service instances may be managed by the cluster manager 140. The cluster manager may create, delete or modify application instances and/or service instances.

In some cases, the cluster manager creates service instances during an application upgrade. The newer service instances may be incompatible with the older versions. Thus, the configuration agent 105, the failover manager 130 and the cluster manager 140 work together to ensure that the appropriate service instance versions are created for each service instance. The service instance version table 115 is maintained by the configuration agent and is continuously updated to ensure that the listing of service instance versions 116 includes the latest versions being used.

The service instance version table 115 may also include additional, service instance related information. For example, the table may also include, for each service instance, the physical or logical location of its corresponding service package. Furthermore, the table 115 may include an indication of each of the steps that are used to start the service instance. Other information pertaining to a particular service or application may also be stored in the service instance version table 115 of the configuration manager 105. The service instance activation module 120 of the configuration manager may be used to determine when to activate the various service instance versions, and may use the additional information stored in the service instance version table to initiate the activation.

The failover manager 130 manages service instance version queries. When it receives a service instance version query, the failover manager indicates to the configuration agent 105 which service instance version to activate to ensure that the appropriate, current version is activated for each service instance. The failover manager may consult the service instance version table 115 when making the determination as to which service instance to activate. The failover manager may, in some cases, receive an activation request for a service instance version that is no longer in use by the cluster 141, and may indicate to the configuration agent that the current version of the requested service instance version is to be activated, instead of the older, requested version.

Out-of-date requests may be the result of communication delays (before or even after the failover manager indicated it was the proper version), computer system hardware failures, nodes that have not yet been upgraded or for other reasons. Still further new computer systems added to the cluster 141 may have been loaded with older versions of service instances, thus causing requests to be sent for out-of-date versions. In some cases, the failover manager may receive an activation request for a service instance version that is no longer in use by the computer system during a cluster version change, and may indicate to the configuration agent 105 that the current version of the requested service instance version is to be activated. The failover manger 130 may also be configured to indicate whether any service instance version upgrades are to occur prior to activating a specified service instance. In such cases, the upgrades are applied prior to activating the service instances.

Figure 3:
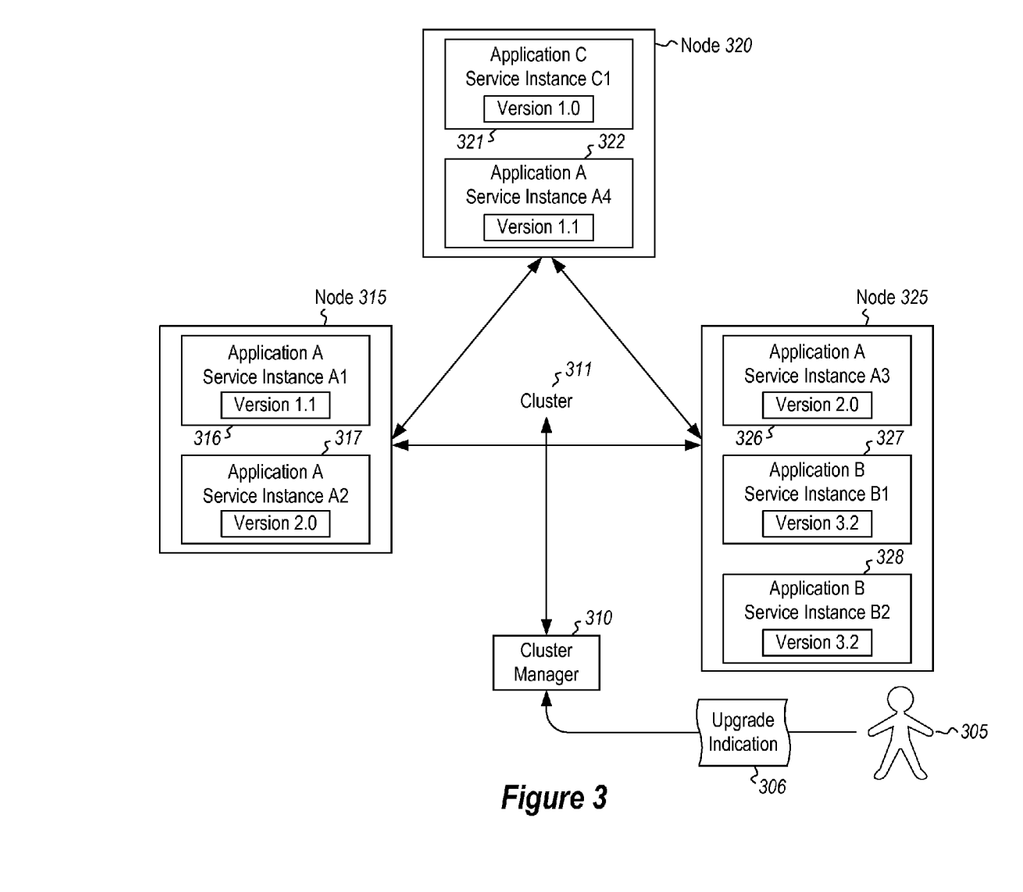
FIG. 3 illustrates a computing environment in which service instances of an application are upgraded in a cluster.

The cluster manager 140 of FIG. 1 can perform a variety of tasks including creating, deleting and upgrading service instances as part of an application instance upgrade. These service instances may be located on multiple different nodes of the cluster 141. For instance, as shown in FIG. 3, a cluster 311 may have three different nodes 315, 320 and 325 (it should be understood that the cluster 311 may have substantially any number of nodes). Each node may have different applications running thereon, as well as different service instances. For example, node 315 may have service instances A1 (316) and A2 (317) for Application A, node 320 may have service instance C1 (321) for Application C and service instance A4 (322) for Application A, while node 325 has service instance A3 (326) for Application A, and service instances B1 (327) and B2 (328) for Application B. Accordingly, each node may have a variety of different service instances corresponding to different applications. The cluster manager 310 may manage these application and service instances, including creating new service instances, deleting old service instances and modifying existing service instances. Each application instance is independently upgradable or modifiable. Similarly, each service instance is independently upgradeable or modifiable.

The cluster manager 310 may be used by an administrator or other user 305 to perform any of the aforementioned tasks. For example, if a user 305 wanted to upgrade an application, upgrade indication 306 would be sent to the cluster manager 310 which would implement the upgrade on the cluster 311, upgrading service instances where necessary.

For example, as shown in FIG. 3, each application service instance is currently running a specified version. Service instances A1 and A4, for example, are running version 1.1, while instances A2 and A3 are running version 2.0. When the cluster manager wants to upgrade service instances A1 and A4 to version 2.0, the cluster manager may initiate the upgrade. Other application service instances may similarly be upgraded. The cluster manager may further indicate to a requesting party (such as a user or other application or service) which service instance version is to be used for a specified service instance. The cluster manager, along with the configuration agent and the failover manager, may also be configured to work together to ensure that a sufficient number of replicas are maintained for the activated service instances. Having a sufficient number of replicas ensures that a working copy of the application or service instance stays available for use. The concepts mentioned above will be explained further below with regard to method 200 of FIG. 2.

Figure 2:
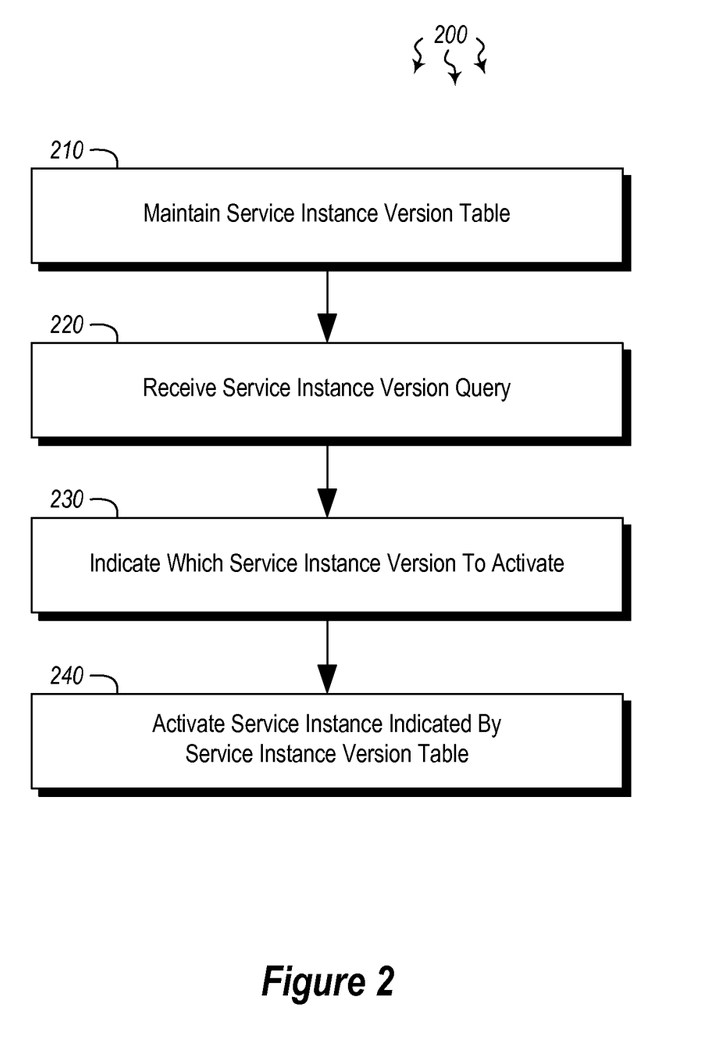
FIG. 2 illustrates a flowchart of an example method for ensuring that only one version of an application is running during an application upgrade.

In view of the systems and architectures described above, methodologies that may be implemented in accordance with the disclosed subject matter will be better appreciated with reference to the flow chart of FIG. 2. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for ensuring that only one version of an application is running during an application upgrade. The method 200 will now be described with frequent reference to the components and data of environment 100.

Method 200 includes an act of maintaining a service instance version table that includes a listing of service instance versions currently running on the computer system as part of one or more application instances, each application instance comprising one or more service instances (act 210). For example, configuration agent 105 may maintain the listing of service instance versions 116 in service instance version table 115. The listing 116 includes current, up-to-date versions for each of the service versions for a particular application (e.g., service version 1.1 for application service instances A1 and A4, and version 2.0 for instances A2 and A3 in FIG. 3). The service instance version table 115 may also include additional, service instance related information including the physical or logical location of the service's corresponding service package, as well as an indication of each of the steps that may be used by the configuration to start the service instance.

Method 200 further includes an act of receiving at least one service instance version query requesting that a specified service instance be activated (act 220). For example, failover manager 130 may receive service instance version query 111 from the service instance version query generating module 110 of the configuration agent 105. The service instance version queries may be received at substantially any time including during an application upgrade. The service instance version query may be generated by one or more service instances and may be received from a computer system that was down or was experiencing latency or was otherwise unavailable during a previous application upgrade.

Method 200 next includes an act of indicating which service instance version to activate based on the listing maintained in the service instance version table, the service instance version table ensuring that the appropriate, current version is activated for each service instance (act 230). For example, service instance determining module 135 of failover manager 130 may determine which service instance is to be activated based on the listing of service instance versions 116. In cases where a service code version is not available locally on the computer system, it may be downloaded from a remote data store. The failover manager may then indicate (e.g., in indication 136) to the configuration agent 105 which service instance is to be activated. Service instance activation module 120 may then activate the service instance indicated by the service instance version table (act 240). In this manner, the most up-to-date and current versions of service instances will be activated, even during an application upgrade.

Accordingly, methods, systems and computer program products are provided which ensure that only one version of an application is running on a cluster and further ensure that only one version of an application is running during an application upgrade.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory;
a configuration agent that performs the following:
generates service instance version queries upon startup to determine which service instance version to activate;
maintains a service instance version table that includes a listing of service instance versions currently running on the computer system as part of one or more application instances, each application instance comprising one or more service instances; and
activates one or more specified service instances;
a failover manager that manages service instance version queries, wherein upon receiving a service instance version query from the configuration agent, requesting that a specified service instance be activated, the failover manager indicates to the configuration agent which service instance version to activate, wherein the failover manager indicates that a different service instance version is to be activated rather than the specified service instance that was requested; and
a cluster manager that performs at least one of creating, deleting and upgrading service instances as part of an application instance upgrade, wherein each application instance is independently upgradable.

2. The computer system of claim 1, wherein the failover manager receives an activation request for a service instance version that is no longer in use by the computer system and indicates to the configuration agent that the different service instance version is to be activated.

3. The computer system of claim 1, wherein the failover manager receives an activation request for a service instance version that is no longer in use by the computer system during a cluster version change, and indicates to the configuration agent that the different service instance version is to be activated.

4. The computer system of claim 1, wherein the request for a service instance version that is no longer in use by the computer system is received from a second computer system that was running a previous version of the service instance, wherein the second computer system was added to a distributed computing system to increase computing capacity for the distributed system.

5. The computer system of claim 1, wherein one or more service instances are created during an application upgrade.

6. The computer system of claim 5, wherein the configuration agent, the failover manager and the cluster manager ensure that appropriate service instance versions are created for the one or more service instances.

7. The computer system of claim 1, wherein the failover manager further indicates whether one or more service instance version upgrades are to occur prior to loading the different service instance version.

8. The computer system of claim 1, wherein at least two of the service instance versions are incompatible with each other.

9. The computer system of claim 1, wherein at least one of the configuration agent, the failover manager and the cluster manager ensures that a sufficient number of replicas are maintained for the activated service instances.

10. The computer system of claim 1, wherein the configuration agent's service instance version table includes one or more portions of additional, service instance related information.

11. The computer system of claim 10, wherein the additional, service instance related information includes the physical or logical location of its corresponding service package.

12. The computer system of claim 10, wherein the additional, service instance related information includes an indication of each of the steps used to start the service instance.

13. The computer system of claim 1, wherein the configuration agent further determines when to activate each service instance version of the application instance.

14. The computer system of claim 1, wherein the cluster manager further indicates to a requesting party which service instance version is to be used for a specified service instance.

15. A computer system comprising the following:
one or more processors;
system memory; and
one or more computer-readable storage media having stored thereon computer-executable instructions that, when executed by the one or more processors, causes the computing system to perform a method for ensuring that only one version of an application is running upon completion of an application upgrade, the method comprising the following:
an act of maintaining a service instance version table that includes a listing of service instance versions currently running on the computer system as part of one or more application instances, each application instance comprising one or more service instances;
an act of receiving at least one service instance version query requesting that a specified service instance be activated;
an act of indicating which service instance version to activate based on the listing maintained in the service instance version table, the service instance version table identifying at least one different service instance, the act of indicating which service instance version to activate comprising indicating that the different service instance should be activated rather than the specified service instance that was requested; and
an act of activating the different service instance indicated by the service instance version table.

16. The computer system of claim 15, wherein the service instance version query is received during an application upgrade.

17. The computer system of claim 15, wherein the service instance version query is received from a computer system that was down during a previous application upgrade.

18. The computer system of claim 15, wherein the service instance version queries are generated by one or more service instances.

19. The computer system of claim 15, wherein the service instance version table includes one or more portions of additional, service instance related information including at least one of the physical or logical locations of its corresponding service package and an indication of each of the steps used to start the service instance.

20. A computer system comprising the following:
one or more processors;
system memory; and
one or more computer-readable storage media having stored thereon computer-executable instructions that, when executed by the one or more processors, causes the computing system to perform a method for ensuring that only one version of an application is running during an upgrade, the method comprising the following:

an act of maintaining a service instance version table that includes a listing of service instance versions currently running on the computer system as part of one or more application instances, each application instance comprising one or more service instances;

an act of receiving at least one service instance version query during an application upgrade, requesting that a specified service instance be activated while the application is being upgraded;

an act of indicating which service instance version to activate based on the listing maintained in the service instance version table, identifying at leas one different service instance, the act of indicating which service instance version to activate comprising indicating that the different service instance should be activated rather than the specified service instance that was requested; and an act of activating the different service instance indicated by the service instance version table.

* * * * *